United States Patent [19]

Berly

[11] Patent Number: 4,746,695

[45] Date of Patent: May 24, 1988

[54] COMPOSITION FOR SIMULATED LEAD STRIPS

[76] Inventor: Arturo Berly, Värdshusv. 38, S-145 50 Norsborg(SE), Sweden

[21] Appl. No.: 882,919

[22] PCT Filed: Oct. 28, 1985

[86] PCT No.: PCT/SE85/00418

§ 371 Date: Jun. 27, 1986

§ 102(e) Date: Jun. 27, 1986

[87] PCT Pub. No.: WO86/02599

PCT Pub. Date: May 9, 1986

[30] Foreign Application Priority Data

Oct. 29, 1984 [SE] Sweden ............... 8405390

[51] Int. Cl.⁴ .................... C08K 3/10; B44F 1/06
[52] U.S. Cl. ...................... 524/13; 524/14; 524/312; 524/313; 524/431; 524/434; 524/440; 524/441; 524/496; 524/503; 524/589; 524/919; 428/38
[58] Field of Search ............ 524/13, 14, 313, 312, 524/503, 496, 441, 440, 431, 919, 589, 434; 428/38

[56] References Cited

U.S. PATENT DOCUMENTS

| | | | |
|---|---|---|---|
| 1,057,325 | 3/1913 | Brown et al. | 524/313 |
| 1,381,738 | 6/1921 | Priest | 524/313 |
| 1,954,835 | 4/1934 | Stauffer | 524/313 |
| 2,046,793 | 7/1936 | Schroeder | 524/313 |
| 2,338,252 | 1/1944 | Marberg et al. | 521/503 |
| 3,427,176 | 2/1969 | Moriya | 106/157 |
| 3,875,091 | 4/1975 | Tsugukuni et al. | 524/272 |
| 4,127,689 | 11/1978 | Holt | 428/38 |
| 4,536,424 | 8/1985 | Laurent | 428/34 |

FOREIGN PATENT DOCUMENTS

| | | | |
|---|---|---|---|
| 0184881 | 6/1986 | European Pat. Off. | 524/13 |
| 948904 | 9/1956 | Fed. Rep. of Germany . | |
| 0234024 | 3/1986 | Fed. Rep. of Germany | 524/313 |
| 2479247 | 3/1980 | France . | |
| 2567138 | 1/1986 | France | 524/313 |
| 0022436 | 2/1974 | Japan | 524/13 |
| 0079627 | 7/1978 | Japan | 524/503 |
| 0100431 | 8/1979 | Japan | 524/313 |
| 0127953 | 10/1979 | Japan | 524/13 |
| 0036227 | 3/1980 | Japan | 524/14 |
| 0192774 | 10/1985 | Japan | 524/14 |
| 1145258 | 7/1986 | Japan | 524/313 |
| 107624 | 10/1965 | Norway . | |
| 398057 | 9/1933 | United Kingdom . | |

OTHER PUBLICATIONS

Derwent Abs. 82066/D45, Fr2479247, 10-81, Bois.
Derwent Abs. 85-210398/35, DD221749, ChemWerk, 5-85.

Primary Examiner—Herbert J. Lilling
Attorney, Agent, or Firm—Lowe, Price, Leblanc, Becker & Shur

[57] ABSTRACT

A composition for simulated lead strips for leaded windows, which composition consists of 50-75 weight % binder, 5-15 weight % pigment, 5-20 weight % oil and 10-30 weight % filling, the binder being a polymer binder, chosen among polyvinyl alcohol based adhesives, polyurethan based adhesives and synthetic rubber based adhesives. The pigment is suitably chosen among metal pigments, bronze powder, iron oxide and graphite, or mixtures thereof. The oil consists preferably of a vegetable, drying oil, like linseed oil. The filling is suitably chosen among wood-flour, saw-dust or sand. A preferred composition consists of 65 weight % polyvinyl alcohol based adhesive, 3 weight % iron oxide, 5 weight % aluminium bronze powder, 11 weight % linseed oil and 16 weight % saw-dust.

12 Claims, No Drawings

COMPOSITION FOR SIMULATED LEAD STRIPS

The present invention relates to a composition for simulated lead strips for leaded windows.

Lead strips has been used for a long time for mounting of glass in e.g. windows and doors. The pieces of glass may be colourless or be coloured in different shades, for instance in windows of coloured glass in churches. Leaded windows are estetically attractive, but their common usage is prevented by the high costs of manufacture, which is due to the extensive manual work and the costs for the lead strips. The object of the invention is to try to eliminate these drawbacks by providing a composition, which can replace the traditional lead strips, and that is cheaper than those. The composition according to the invention is also intended to be extruded with the aid of simple spray gun tools, in which way the manufacture of leaded windows can be substantially rationalized.

The objects of the invention are achieved by a composition of the art which is characterized in that it consists of

| 50-75 | weight % binder, |
| 5-15 | weight % at least one pigment, |
| 5-20 | weight % oil, and |
| 10-30 | weight % filling. |

It is preferred in the invention that the composition consists of

| 60-70 | weight % binder |
| 5-10 | weight % pigment |
| 7-15 | weight % oil |
| 10-20 | weight % filling. |

The object of the binder is to bind the components in the composition according to the invention, and further the binder shall possess a good adhesiveness to glass. These properties are possessed by a plurality of polymer such as thermoplastic and thermosetting polymer binders. Among especially preferred polymer binders may be mentioned (a) polyvinylalcohol based adhesives, e.g. those wherein the polyvinyl alcohol is present in the form of a dispersion (BOSTIK ADHESIVE 750), (b) polyurethane-based adhesives (e.g. BOSTIK ADHESIVE 800), and (c) synthetic rubber-based adhesives (e.g. BOSTIK 25 SET ADHESIVE).

The pigment of the composition may consist of one single pigment, but it is preferably formed by a combination of two or more pigments. The main object of the pigment is to give the composition the desired colour and lead or metal brilliance, but the pigment can to some degree act as extender or filling. Among suitable pigment materials there may be mentioned iron oxide, graphite, metal pigments and bronze powder, like aluminium bronze powder, copper bronze powder and gold bronze powder, which pigments can be used alone or in combination with each other, as has been mentioned above. According to the invention, it is preferred to use, especially, iron oxide powder in combination with aluminium bronze powder.

The oil of the composition has as an object to act as a lubricant and consistency agent to give the composition the desired pastelike consistency in order that the composition may be extruded in a satisfactory way to strip form without flowing after the extrusion. Further the oil acts to impregnate the filling, that is within the composition, and the oil also gives the desired surface finish and brilliance to the extruded stripe and suitably contributes to the hardening of the composition. The properties now mentioned are possessed in an excellent way by vegetable oils and preferably by drying vegetable oils. One preferred vegetable oil in the invention is linseed oil, raw or boiled.

The filling in the composition according to the invention acts to make the composition smooth and to give it the right consistency for extrusion to stripe form. The filling also contributes to giving ready stripe structure and surface texture. Suitable fillings comprise powder materials, like wood-flour, saw-dust, sand, metal powder and the like. One preferred filling in the invention is wood-flour or saw-dust.

In order further to illustrate the invention there is given, below, an example of the most preferred embodiment for the moment being.

EXAMPLE

A composition was manufactured with the formulation below, by mixing at room temperature, the components in a vessel with mixer.

| Component | Parts by weight | Weight % |
| --- | --- | --- |
| Polyvinyl alcohol based adhesive (BOSTIK ADHESIVE 750) | 625 | 65 |
| Iron oxide powder | 25 | 3 |
| Aluminium bronze powder | 50 | 5 |
| Linseed oil | 100 | 11 |
| Saw-dust | 150 | 16 |

The composition manufactured was filled in a cartridge of a hand-pistol for extrusion, the nozzle of which had the form of a profile, and gave at extrusion a strip profile, the appearance and properties of which substantially correspond to those of a lead strip.

We claim:

1. Composition for simulated lead strips for leaded windows, characterized in that it consists of

| 50-75 | weight % binder, |
| 5-15 | weight % of at least one pigment, |
| 5-20 | weight % vegetable oil, and |
| 10-30 | weight % filling, | the binder being a polymer binder selected from the group consisting of polyvinyl alcohol adhesives, polyurethane adhesives and synthetic rubber adhesives.

2. Composition according to claim 1, characterized in that the polymer binder is a polyurethan adhesive.

3. Composition according to claim 1, characterized in that it consists of

| 60-70 | weight % binder, |
| 5-10 | weight % pigment, |
| 7-15 | weight % vegetable oil, and |
| 10-20 | weight % filling. |

4. Composition according to claim 1, characterized in that the pigment is selected from the group consisting of graphite, metal pigments, bronze powder, copper bronze powder, gold bronze powder and mixtures thereof.

5. Composition according to claim 4, characterized in that the bronze powder is selected from the group consisting of aluminum bronze powder, copper bronze powder and gold bronze powder.

6. Composition according to claim 1, characterized in that the vegetable oil is a drying oil.

7. Composition according to claim 6, characterized in that the drying oil is selected from the group consisting of raw and boiled linseed oil.

8. Composition according to claim 1, characterized in that the filling is a powder material selected from the group consisting of wood-flour, saw-dust, metal powder and sand.

9. Composition according to claim 1, characterized in that it consists of about 65 weight % polyvinyl alcohol adhesive, about 3 weight % iron oxide powder, about 5 weight % aluminium bronze powder, about 11 weight % linseed oil and about 16 weight % saw-dust.

10. The composition of claim 4, wherein the pigment is a mixture of iron oxide powder and aluminum bronze powder.

11. The composition of claim 8, wherein the filler is selected from the group consisting of wood-flour and saw dust.

12. The composition of claim 1, consists of

| | |
|---|---|
| about 65 wt. % | polyvinyl alcohol adhesive, |
| about 3 wt. % | iron oxide powder, |
| about 5 wt. % | aluminum bronze powder, |
| about 4 wt. % | oil, and |
| about 16 wt. % | filling. |

* * * * *